United States Patent
Barth et al.

(10) Patent No.: US 6,789,965 B2
(45) Date of Patent: Sep. 14, 2004

(54) DOT PRINTER WITH OFF-AXIS LOADING

(75) Inventors: Phillip W Barth, Portola Valley, CA (US); Gary B. Gordon, Saratoga, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 5 days.

(21) Appl. No.: 10/159,415

(22) Filed: May 31, 2002

(65) Prior Publication Data

US 2003/0223796 A1 Dec. 4, 2003

(51) Int. Cl.[7] ............................... B41J 2/285; G01N 1/10
(52) U.S. Cl. ........................... 400/124.28; 400/124.29; 347/20; 346/141; 118/241; 118/243; 118/401; 436/180
(58) Field of Search ................... 400/124.28, 124.29; 118/400, 401, 407, 410, 411, 241, 243; 346/140.1, 141; 436/518, 180; 347/20, 21; 289/102, 102.2

(56) References Cited

U.S. PATENT DOCUMENTS

| | | | | |
|---|---|---|---|---|
| 2,556,550 A | * | 6/1951 | Murray | 430/348 |
| 3,329,964 A | * | 7/1967 | Mutschler et al. | 346/78 |
| 3,334,354 A | * | 8/1967 | Mutschler | 346/140.1 |
| 4,155,229 A | * | 5/1979 | Mitter | 68/200 |
| 4,495,885 A | * | 1/1985 | Derks et al. | 118/241 |
| 5,660,792 A | * | 8/1997 | Koike | 422/63 |
| 5,777,636 A | * | 7/1998 | Naganuma et al. | 347/10 |
| 5,933,576 A | * | 8/1999 | Muramatsu | 358/1.1 |
| 6,083,763 A | * | 7/2000 | Balch | 436/518 |
| 6,228,659 B1 | * | 5/2001 | Kowallis et al. | 436/180 |
| 6,428,752 B1 | * | 8/2002 | Montagu | 422/104 |
| 6,467,893 B1 | * | 10/2002 | Matsumoto et al. | 347/98 |
| 6,479,301 B1 | * | 11/2002 | Balch et al. | 436/518 |
| 6,502,803 B1 | * | 1/2003 | Mattes | 251/129.06 |
| 6,506,611 B2 | * | 1/2003 | Bienert et al. | 436/180 |
| 6,551,557 B1 | * | 4/2003 | Rose et al. | 422/100 |
| 6,579,367 B2 | * | 6/2003 | Vann et al. | 118/401 |
| 6,594,432 B2 | * | 7/2003 | Chen et al. | 385/133 |

* cited by examiner

Primary Examiner—Andrew H. Hirshfeld
Assistant Examiner—Dave A. Ghatt
(74) Attorney, Agent, or Firm—Michael J. Beck

(57) ABSTRACT

A pin-in-capillary apparatus for depositing droplets of fluid onto a surface is described. The apparatus has an off-axis channel for supplying fluid to the capillary. In the capillary the fluid wets the tip of the pin and is delivered to the surface when the pin is extended from the capillary. The capillaries and pins are flexible, allowing spatial reformatting for fluid delivery. Methods of delivering fluid to a surface are also described.

20 Claims, 3 Drawing Sheets

DOT PRINTER WITH OFF-AXIS LOADING

CROSS REFERENCE TO RELATED APPLICATION

DESCRIPTION

1. Field of the Invention

The invention relates generally to a device and method for the printing of high density arrays for use in biological and chemical assays in the form of a device that can be used in sample transfer directly from a standard multiple-well microassay plate to a substrate.

2. Background of the Invention

Biomolecules, such as peptides or oligonucleotides, immobilized on planar substrates are increasingly useful as diagnostic or screening tools. Such "bioarrays" include regions of usually different biomolecules arranged in a predetermined configuration on the substrate. These regions (sometimes referenced as "features" or "spots") are positioned at respective locations ("addresses") on the substrate. The arrays, when exposed to a sample, will exhibit an observed binding pattern. This binding pattern can be detected upon interrogating or imaging the array. Data obtained from the interrogation or imaging process are then analyzed to determine information about the sample. For example, all polynucleotide targets (e.g. DNA) in a sample can be labeled with a suitable label (such as a fluorescent compound) to provide a suitable binding signal during the interrogation or imaging process, and the labeled sample can then be assayed using an oligonucleotide array. Following exposure to the labeled sample, the fluorescence pattern on the array can be accurately observed. Assuming that the different sequence oligonucleotides were correctly deposited in accordance with the predetermined configuration, then the observed binding pattern will be indicative of the presence and/or concentration of one or more polynucleotide components of the sample.

Bioarrays can be fabricated by depositing previously obtained biomolecules onto a substrate surface, or by in situ synthesis of the biomolecule on the substrate surface. Fabrication of bioarrays typically involves deposition of very small droplets of reagent solutions onto the substrate surface. Both manual and automated devices for dispensing very small fluid volumes have been devised, including, for example, micropipettes, pins, capillaries, and inkjet devices. One way of making bioarrays that has been described involves depositing dots of fluid chemicals on a substrate surface using a rod that pokes out of a capillary and touches off a drop of fluid onto the substrate. While the art contains a variety of references related to this technique, each of these is associated with certain disadvantages.

U.S. Pat. No. 2,643,801 to Kollmeyer, "Watch Oiler" (1953) describes a rigid capillary tube through which a rigid wire extends and an on-axis reservoir surrounding the wire for depositing a drop of oil on a jeweled bearing in a watch. The device touches off a drop of oil from the oiler to the bearing without direct contact between the oiler and the bearing.

U.S. Pat. No. 3,334,354 to Mutschler, "Dotting Ink Recorder" (1967) describes a dot printer with a rigid capillary tube through which a rigid pin extends, and on-axis reservoir surrounding the pin and fed by an off-axis non-capillary fill port. The invention avoids splashing during printing by touching only the fluid on the tip of the pin, rather than the pin itself, to the paper substrate on which printing occurs.

U.S. Pat. No. 4,194,846 to Zerillo, "Dot Matrix Printing Device Employing a Novel Image Transfer Technique to Print on Single or Multiple Ply Print Receiving Materials" (1980), assigned to Centronics Data Computer Corp., describes a dot printer with a rigid capillary tube through which a flexible pin extends, and an off-axis ink reservoir feeding the same color ink to multiple flexible pins extending through a rigid matrix.

International patent application WO 00/54883, "Apparatus and Method for Spotting a Substrate," applied for by Perkin-Elmer Corp., describes a dot printer with a tube through which a flexible pin extends and an on-axis reservoir surrounding the pin.

European patent application EP 1002570(A1) and international patent application WO 00/30754, "Capillary Transfer Device for High Density Arrays," applied for by Corning Inc., describe a dot printer with a rigid capillary tube through which a flexible pin extends, and an on-axis reservoir surrounding the pin. The pin must be removed from the capillary tube in order to fill the reservoir. A plurality of tubes and reservoirs are formed in a rigid matrix. This application also describes touching the flat-faced pins to the substrate or expelling fluid across open space in order to print, which risks splashing fluid.

With the exception of the noted EP '570 patent, the above-cited references teach pin-in-capillary printers that can deposit drops without splashing, avoiding resultant cross-contamination between drops. But none of the above printers are easy to load with the expensive fluids that the bioscience industry prepares in standard plastic microassay plates containing, e.g., 96, 384, or 1536 separate wells, with each well having a fluid volume on the order of microliters.

U.S. Pat. No. 6,083,763 to Balch, assigned to Genometrix, and associated international patent application WO98/29736 (A1), describe a capillary printer comprising a flexible capillary extending from a point near a substrate to be printed to a reservoir which is on-axis with the capillary. Multiple capillaries are bundled together and extend through a rigid guide matrix through which the capillaries slide. Advantageously, multiple capillaries can be fed from multiple reservoirs comprising a standard multiple well microassay plate. However, the capillaries have a large diameter in comparison to the pin of the above-described pin-in-capillary printers, leading to lower density of dots and larger dot size. Also, the required free length of capillary for needed flexing (that is, elastic buckling) during printing to accommodate surface irregularity of the substrate is larger than the required free length of thin pins for needed flexing in comparable pin-in-capillary schemes, leading to potentially greater size and mass of the reciprocating portion of the apparatus than in comparable pin-in-capillary schemes. Further, capillaries without internal sliding pins can be more difficult to clean in the event of clogs than pin-in-capillary devices, where the pin can act like a pipe cleaner to dislodge deposits within the capillary.

Thus there still exists a need for a multiple-fluid pin-in-capillary printer where multiple incoming fluids can be conveyed directly from multiple reservoirs (such as in a standard multiple-well microassay plate) to the closely-spaced tips of the pins near the substrate, in a manner leading to low overall size and mass of the reciprocating portion of the apparatus.

SUMMARY OF THE INVENTION

The invention addresses the aforementioned deficiencies in the art, and provides novel methods for printing high density biological or chemical arrays on substrates using a fluid droplet delivery apparatus. The method and apparatus of the invention use one or more flexible pins threaded through flexible capillaries, wherein each capillary has a uniform cross sectional area along its length. Each capillary, with the pin threaded through it, is narrow enough to retain fluid by capillary action without drooling. Fluid is expelled from a capillary by extending the tip of the pin from an end of the capillary, whereupon the wetted tip, or the fluid wetting the pin tip, can then touch a substrate to transfer a droplet of fluid to the substrate. Greater fluid volumes may be delivered by retracting the pin further within the capillary and quickly translocating the pin so the pin will, piston-like, pump fluid out of the capillary. Advantageously, each pin may be extended individually, or pins may be extended in associated groups, and the substrate can be moved beneath the capillary ends, so that the density of deposited droplets on the substrate can be greater than the packing density of the pin tips near the substrate.

Far from the substrate, the capillaries can fan out to a density low enough to permit fluid loading through an attached fluid flow manifold. The fluid flow manifold has fluid source channels in fluid communication with the capillary lumens via off-axis ports. The fluid source channels are also in fluid communication with one or more reservoirs, such as wells in a microtiter plate. Each pin extends from its tip at the downstream end of the capillary near the substrate and upstream through the capillary lumen, to operatively connect with a pin driver such as a solenoid driver. Advantageously, an air gap region may be present at the upstream end of the capillary to prevent the fluid in the capillary from welling upward to the top surface of the manifold. The pin may also have an elastic buckling region that accommodates for substrate irregularities. The pins need not be removed from the capillaries during fluid loading, and the required priming volume is low, allowing reduced setup costs, cost-competitive small production runs, and minimal use of expensive chemicals. The invention provides for off-axis loading of a pin-in-capillary printer where each capillary/pin combination may be in communication with a separate reservoir. Advantageously, because the separate flexible capillaries do not form a rigid matrix, the spatial ordering of the outlet ends of the capillaries can be different than the spatial ordering of the input ends of the capillaries, providing additional freedom in spatial reformatting, e.g. between the source microassay plates and the resulting microarrays.

Additional objects, advantages, and novel features of this invention shall be set forth in part in the descriptions and examples that follow and in part will become apparent to those skilled in the art upon examination of the following specifications or may be learned by the practice of the invention. The objects and advantages of the invention may be realized and attained by means of the instruments, combinations, compositions and methods particularly pointed out in the appended claims.

BRIEF DESCRIPTION OF THE DRAWINGS

These and other features of the invention will be understood from the description of representative embodiments of the method herein and the disclosure of illustrative apparatus for carrying out the method, taken together with the Figures, wherein.

To facilitate understanding, identical reference numerals have been used, where practical, to designate corresponding elements that are common to the Figures. Figure components are not drawn to scale.

DETAILED DESCRIPTION

Figure 1:
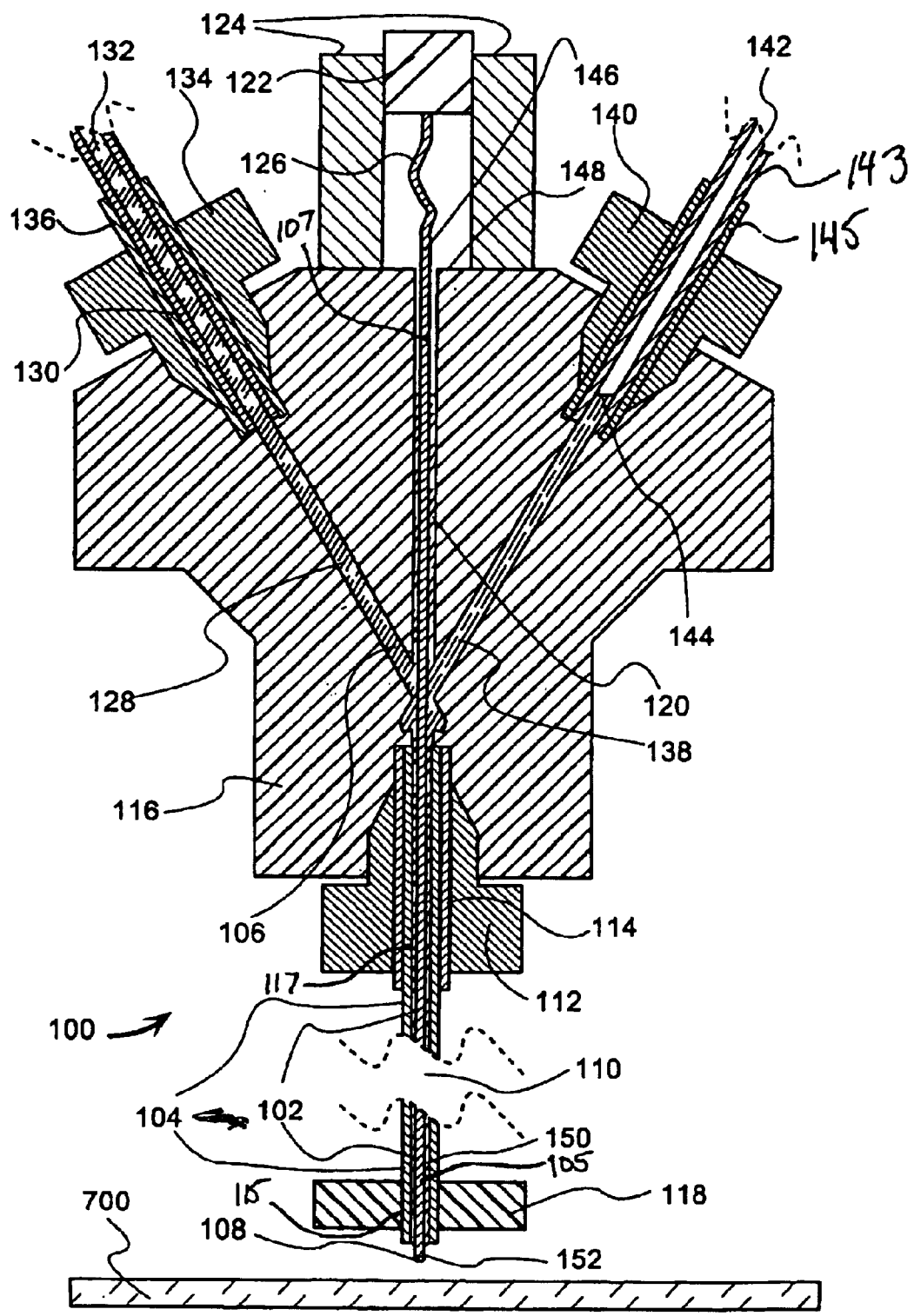
FIG. 1 illustrates a structure according to the present invention having a single pin-in-capillary.

Before the invention is described in detail, it is to be understood that unless otherwise indicated this invention is not limited to particular materials, reagents, reaction materials, manufacturing processes, or the like, as such may vary. It is also to be understood that the terminology used herein is for purposes of describing particular embodiments only, and is not intended to be limiting. It is also possible in the present invention that steps may be executed in different sequence where this is logically possible. However, the sequence described below is preferred.

It must be noted that, as used in the specification and the appended claims, the singular forms "a," "an" and "the" include plural referents unless the context clearly dictates otherwise. Thus, for example, reference to "an insoluble support" includes a plurality of insoluble supports. In this specification and in the claims that follow, reference will be made to a number of terms that shall be defined to have the following meanings unless a contrary intention is apparent:

An "array" includes any one, two or three dimensional arrangement of addressable regions bearing a particular chemical moiety or moieties (for example, polynucleotide sequences) associated with that region. A "bioarray" is an array of biomolecules. "Biomolecule" refers to molecules generally derivable from living organisms, or analogues thereof. Biomolecules include, e.g. amino acids, oligopeptides, polypeptides, nucleotide monomers, oligonucleotides, polynucleotides, saccharides, polysaccharides, hormones, growth factors, peptidoglycans, or the like, or analogues thereof. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). While probes and targets of the present invention will typically be single-stranded, this is not essential. An "array layout" refers to one or more characteristics of the array, such as feature positioning, feature size, and some indication of a moiety at a given location. "Feature deposition" refers to a process of putting biomolecules on the substrate surface after the surface is prepared; feature deposition encompasses, e.g methods of in situ synthesis, placing droplets of biomolecules on the surface, and crosslinking of biomolecules to the surface. Such methods are readily available in the art and may be routinely adapted to use with the method and apparatus of the current invention by one of ordinary skill in the art. "Format" refers to a spatial relationship among similar or related items, for example in a group of capillaries that have a defined spatial relationship to each other; as another example, a group of wells in a microtiter plate are arranged in an x-y grid format. Other possible formats include linear formats, circular formats, and other regular or irregular formats.

The practice of the present invention will employ, unless otherwise indicated, conventional techniques of synthetic organic chemistry, biochemistry, molecular biology, printer device manufacturing, and the like, which are within the skill of the art. Such techniques are explained fully in the literature.

The following embodiments are put forth so as to provide those of ordinary skill in the art with a complete disclosure and description of how to perform the methods and use the apparatus disclosed and claimed herein. Efforts have been made to ensure accuracy with respect to numbers (e.g., amounts, temperature, etc.) but some errors and deviations should be accounted for.

In the descriptions of the Figures contained herein, downstream refers to features of the structure generally closer to the substrate or surface upon which fluid is being deposited (the receiving surface, or working surface), and upstream refers to features of the structure generally farther away from the substrate or surface upon which fluid is being deposited (e.g. relatively closer to the pin driver or fluid reservoir or fluid source).

Referring now to the Figures, FIG. 1 illustrates a cross section of a pin spotter 100 according to the present invention. The elements of pin spotter 100 are shown schematically for purposes of illustration and are not necessarily drawn to scale. Substrate 700, which is not part of pin spotter 100, is the substrate onto which droplets of fluid are to be deposited and is shown for illustrative purposes. Any method of construction resulting in equivalent alternate structures may replace the conventional fabrication methods used to form pin spotter 100.

Pin spotter 100 includes a capillary 104 defining a capillary lumen 150. The capillary 104 has a downstream capillary end 115 retained by a downstream capillary holder 118 and an upstream capillary end 117 retained within a manifold body 116 via a capillary fitting 112. The capillary fitting 112 can be a standard finger-tight fitting that, with capillary fitting sleeve 114, serves to locate and retain capillary 104 in the manifold body 116. The manifold body 116 defines a manifold channel 120 that is contiguous with the capillary lumen 150. Manifold body 116 can be constructed by use of conventional machining techniques using, for example, inert materials such as stainless steel or polyetheretherketone (PEEK) as the construction material. In one embodiment, capillary 104 may be, for example, a fused quartz capillary coated on its exterior surface with a layer of polyimide as is typically used for applications in gas chromatography or capillary electrophoresis. In FIG. 1 the downstream capillary end 115 is shown extending beyond the downstream surface of the downstream capillary holder 118; but in alternate embodiments the downstream capillary end 115 terminates flush at the downstream surface of the downstream capillary holder 118 or even within the downstream capillary holder 118.

A pin 102 is slidably and extendibly disposed within the capillary lumen 150 and the manifold channel 120. The pin 102 includes a pin downstream portion 105 terminating at tip 152, the pin downstream portion 105 maintained within the capillary lumen 150. The pin 102 further includes a pin upstream portion 107 including a flex region 126, the pin upstream portion 107 maintained within the manifold channel 120 and the flex region 126 operatively connected to a pin driver 122. The pin driver 122 is supported on the manifold body 116 via a housing 124, and, in some embodiments, the housing 124 supporting the pin driver 122 provides an air-tight seal against the manifold body 116. The flex region 126 has a spring-like characteristic that allows for smooth operation of the pin spotter 100 despite variations in the location of the substrate 700 with respect to the tip 152, and also allows for limiting the force with which the tip 152 contacts the substrate 700. Advantageously, pin 102 has a pin surface region 146 that may be made hydrophobic with respect to fluid 106 to deter spillage into housing 124, and manifold channel 120 has a manifold surface region 148 that may be made hydrophobic with respect to fluid 106 to deter spillage into housing 124. The pin 102 may be made of any suitable material, for example, glass fiber, metal wire, or a polymer. The pin driver 122 is any suitable device for displacing the pin 102 through the distance required to extend the tip 150 to deliver a drop of fluid 108 to the receiving surface. Examples of such devices are known in the art and can be applied by those having ordinary skill in the art. In certain embodiments, the pin driver comprises a solenoid that can be triggered by an electric pulse.

The manifold body 116 defines an off-axis channel 128 extending from the manifold channel 120 to a fluid source fitting 134. The source fitting 134, including source fitting sleeve 136, couples the manifold body 116 to a source tube 130 in fluid communication with a fluid source. The portion of the off-axis channel 128 near the manifold channel 120 defines an off-axis channel longitudinal axis; and the pin 102 where it extends past the junction of the off-axis channel 128 with the manifold channel 120 defines a pin longitudinal axis (which is coincident with the direction that the pin may slide within the capillary). "Off-axis" as used to describe the off-axis channel 128 means that the off axis channel 128 approaches the pin 102 from a direction that departs from the long axis of the pin 102. Put another way, the angle between the off-axis channel longitudinal axis and the pin longitudinal axis is greater than about zero degrees; in certain embodiments the angle may be greater than about 15 degrees and less than about 165 degrees. In specific embodiments, the angle may be greater than about 30 degrees and less than about 150 degrees, and in some embodiments the angle may be greater than about 45 degrees and less than about 135 degrees. In some embodiments, the angle may be greater than about 60 degrees and less than about 120 degrees, and in some embodiments the angle may be greater than about 75 degrees and less than about 105 degrees. In one embodiment the angle is about 90 degrees. In some embodiments, the off-axis channel 128 may approach the vicinity of the pin 102 from one direction and then make a turn that results in the off-axis channel 128 intersecting the manifold channel 120, in which case "off-axis" describes that portion of the off-axis channel 128 between the turn and the pin 102, wherein the portion of the off-axis channel 128 between the turn and the pin 102 defines the off-axis channel longitudinal axis. As a special case, in embodiments in which the pin 102 is curved at the junction of the off axis channel 128 with the manifold channel 120, the curve of the pin 102 at the junction of the off axis channel 128 with the manifold channel 120 defines a tangent line in the plane of the curve and this tangent line defines the pin longitudinal axis. In certain embodiments (not shown), the source tube (130) may connect to a fluid source via a source apparatus having elements similar to those shown in FIG. 1, with a pin-in-capillary operatively associated with a pin driver, the pin driven by the pin driver to reciprocate within the capillary to actively move fluid between a fluid reservoir and the source tube 130; in particular embodiments this source apparatus may be supported on the manifold body 116 and the source tube omitted (the source apparatus in direct fluid communication with the off axis channel 128.

Manifold body 116 defines a surge channel 138 extending from the manifold channel 120 to a surge channel fitting 140. The surge channel fitting 140, including surge channel fitting sleeve 145, couples the manifold body 116 to an external gas source via a gas supply tube 143. The gas source serves to control the pressure at a fluid-air interface 144. In particular embodiments the gas source may simply be ambient air pressure (i.e the gas supply tube 143 vents to the atmosphere), or in other embodiments the gas source may be air or inert gas at a specified pressure. In an alternate embodiment the surge channel 138 and surge channel fitting 140 may be omitted. In another embodiment the surge channel 138 may be defined by the housing 124, and the surge channel fitting 140 couples the housing 124 to the external gas source. In such an embodiment, the housing 124 supporting the pin driver 122 may provide an air-tight seal against the manifold body 116.

It will be appreciated that surge channel 138 may be employed for additional purposes including acting as a source for an additional fluid or fluids to be mixed with the fluid supplied through off-axis channel 128, and acting as a source for a fluid used to flush out one or more of manifold channel 120, off-axis channel 128, and capillary 104. It will be further appreciated that additional instances of off-axis channel 128 and source tube 130 may be incorporated into manifold body 116 for purposes including acting as a source for an additional fluid or fluids.

Break lines at feature 110 indicate that the capillary 104 and pin 102 can be too long to show in their entirety in FIG. 1. It should be appreciated that capillary 104 is flexible and pin 102 is flexible, so that the downstream capillary end 115 need not be located either parallel to, or in line with, the upstream capillary end 117. It should also be appreciated that both capillary 104 and pin 102 may be bent so that tip 152 of pin 102 is positioned at a height less than, near to, or greater than, fluid-air interface 144. It should also be appreciated that pin 102 need not point vertically downward at its tip 152 (relative to the earth), and that substrate 700 need not be positioned perpendicularly with respect to tip 152 of pin 102.

In operation source tube 130 connects to an external fluid source and conducts fluid 106 from the fluid source to the off-axis channel 128. The downstream capillary end 115 is in fluid communication with the fluid source via the capillary lumen 150 and the off-axis channel 128; fluid flows from the off-axis channel 128 into the capillary lumen 150 to the downstream capillary end 115. The capillary 104 is sized so that the fluid remains contained within the capillary lumen 150 by means of capillary attraction forces. The pin 102 slides within capillary 104 under operation by the pin driver 122. The pin 102 is calibrated so that during operation the tip 152 may be held slightly within the capillary lumen 150 (inside the downstream capillary end 115), where the tip 152 is wetted by the fluid, and then the pin 102 may be extended out of the downstream capillary end 115 towards the substrate 700 until a drop of fluid 108 retained on the tip 152 is displaced onto the substrate 700. The pin 102 then slides within the capillary 104 and manifold channel 120 to retract the tip 152 back into the capillary lumen 150. In one embodiment, the pin 102 is treated to render the tip 152 hydrophilic and the sides of the pin 102 hydrophobic to provide for more reliable wetting of the tip 152. The tip 152 of the pin 102 may also be selected so the tip 152 can carry a specified volume, depending mainly on the diameter and geometry of the pin 102 and the surface characteristic of the tip 152.

In operation of the pin spotter 100, fluid 106 is replenished through off-axis channel 128. Surge channel 138 allows for variation in the volume of fluid 106 within manifold body 116. It will be appreciated that the volume of surge channel 138 is minimized in order to minimize the use of expensive source fluids during priming of pin spotter 100 in preparation for use, and in some situations surge channel 138 can be entirely absent. Similarly, in some embodiments the volume of source channel 128 is minimized in order to minimize the usage of expensive fluids during priming of the pin spotter 100. In some embodiments the volume of the capillary lumen 150 and/or the manifold channel 120 is likewise minimized.

Downstream capillary holder 118 at the downstream capillary end 104 serves to position the downstream capillary end 115 (and the tip 152) with respect to substrate 700. In certain embodiments the downstream capillary holder 118 may retain a plurality of downstream capillary ends 115 and hold the downstream capillary ends in a defined spatial format (a "downstream format") with respect to each other. Such embodiments are explained further below with respect to the remaining Figures. Each downstream capillary end 115 retained by the downstream capillary holder 118 is associated with a pin 102 and a pin driver 122. In certain embodiments each pin 102 may be associated with its own pin driver 122, and the pin drivers 122 may be actuated simultaneously, or each pin driver 122 may be actuated independently of the other pin drivers 122 to extend selected pins 102. In some embodiments a single pin driver 122 may actuate more than one pin 102, for example, where a plurality of pins 102 is served by a single impact driver.

Figure 2:
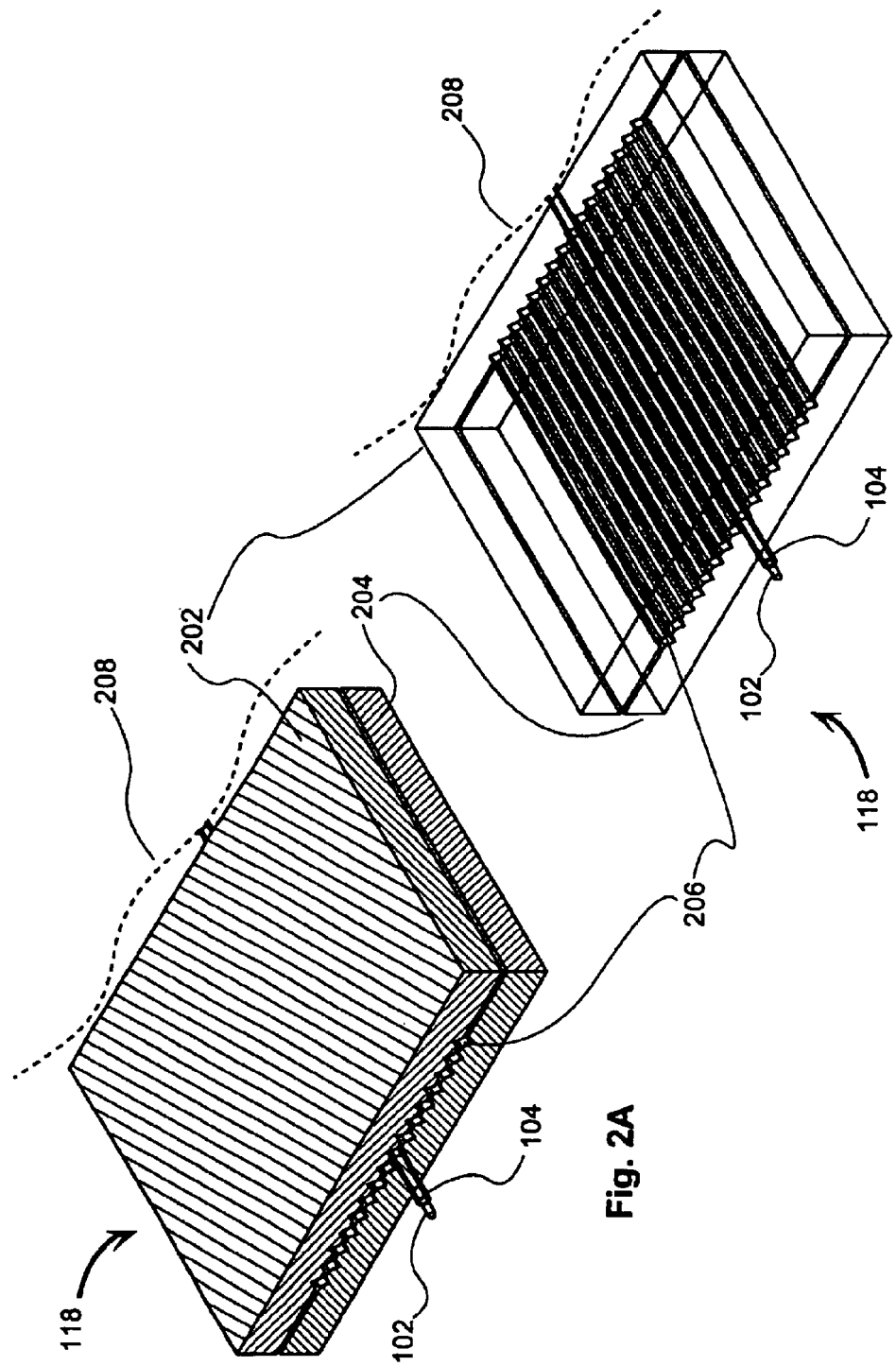
FIGS. 2A and 2B illustrate details of a capillary holder at the downstream end of a capillary, capable of holding sixteen capillaries in an aligned configuration.

FIGS. 2A and 2B illustrate details of the downstream capillary holder 118, in an embodiment wherein sixteen capillaries such as capillary 104 may be ganged in parallel on 250 micrometer centers. FIG. 2A illustrates a solid view, while FIG. 2B illustrates a wireframe view. Top member 202 and base member 204 are, for example, micromachined pieces of silicon, each having sixteen V-shaped grooves ("V-grooves") 206 formed by well known chemical etching techniques. In the embodiment illustrated, pin 102 has a diameter of 80 micrometers and is a glass fiber, while capillary 104 is a quartz capillary coated with polyimide having an inner diameter of 100 micrometers and an outer diameter of 150 micrometers. The precisely machined V-grooves 206 in top member 202 and base member 204 are mated to the outer diameter of the capillary 104 and to fifteen other similarly sized capillaries (not shown), one capillary in each V-groove 206, to form a precisely held linear array of sixteen capillaries with sixteen pins such as pin 102 extending past break line 208 to sixteen pin driver structures such as pin spotter 100. This arrangement of capillaries using V-grooves is similar to that known in the art for the alignment of fiber optic elements in the form of a ribbon cable using silicon alignment plates having V-grooves. In certain embodiments top member 202 is removable and replaceable with respect to the base member 204 and the capillaries 104, allowing the capillaries 104 to be moved to different V-grooves 206 (i.e. to be placed in a different format), or allowing clogged or defective capillaries 104 to be replaced, before the top member 202 is replaced on the base member 204.

The downstream capillary holder 118 illustrated in FIGS. 2A and 2B is thus well suited for converting the spacing of capillaries from that of sixteen separate pin spotters such as pin spotter 100, which may be spaced in a single line on centers of, for example, two centimeters, to spacing of 250 micrometer centers at the downstream capillary ends retained in the V-grooves 206 of the top member 202 and base member 204. If the sixteen separate pin drivers are fed from sixteen reservoirs from, for example, one sixteen-well row of a microtiter plate where the microtiter plate has 384 fluid wells in a 16×24 array on 4.5 mm centers, then the net effect of using the array of sixteen pin spotters is to compress the fluid spacing from 4.5 mm to 250 micrometers, giving a linear compression ratio of eighteen.

Since the example diameter of pin 102 is 80 micrometers, and since the tip 152 can be formed to have a smaller diameter than the pin 102, the spot deposited on substrate 700 from the drop of fluid 108 can have a diameter less than 100 micrometers. Thus it is possible to take a second downstream capillary holder, not shown, similar to downstream capillary holder 118, and to offset its position so that, by moving substrate 700 to a new position, the drops on 250 um centers from the second downstream capillary holder can be placed between the drops deposited from downstream capillary holder 118, forming a linear array of 32 spots on 125 micrometer centers, giving a linear compression ratio of thirty-six.

Continuing in this manner with additional pairs of downstream capillary holders each containing sixteen capillaries, and moving substrate 700 to new positions, it is then possible to create a rectangular array of 384 spots on 125 micrometer centers in a 32×12 format corresponding to the 16×24 format of the original 384-well microtiter plate. The areal compression ration of the array deposited by the pin spotters is then 36 squared, or 1,296.

The examples and numbers used in the above discussion are representative only and do not imply any upper or lower bounds on spot size, number, and spacing.

Figure 3:
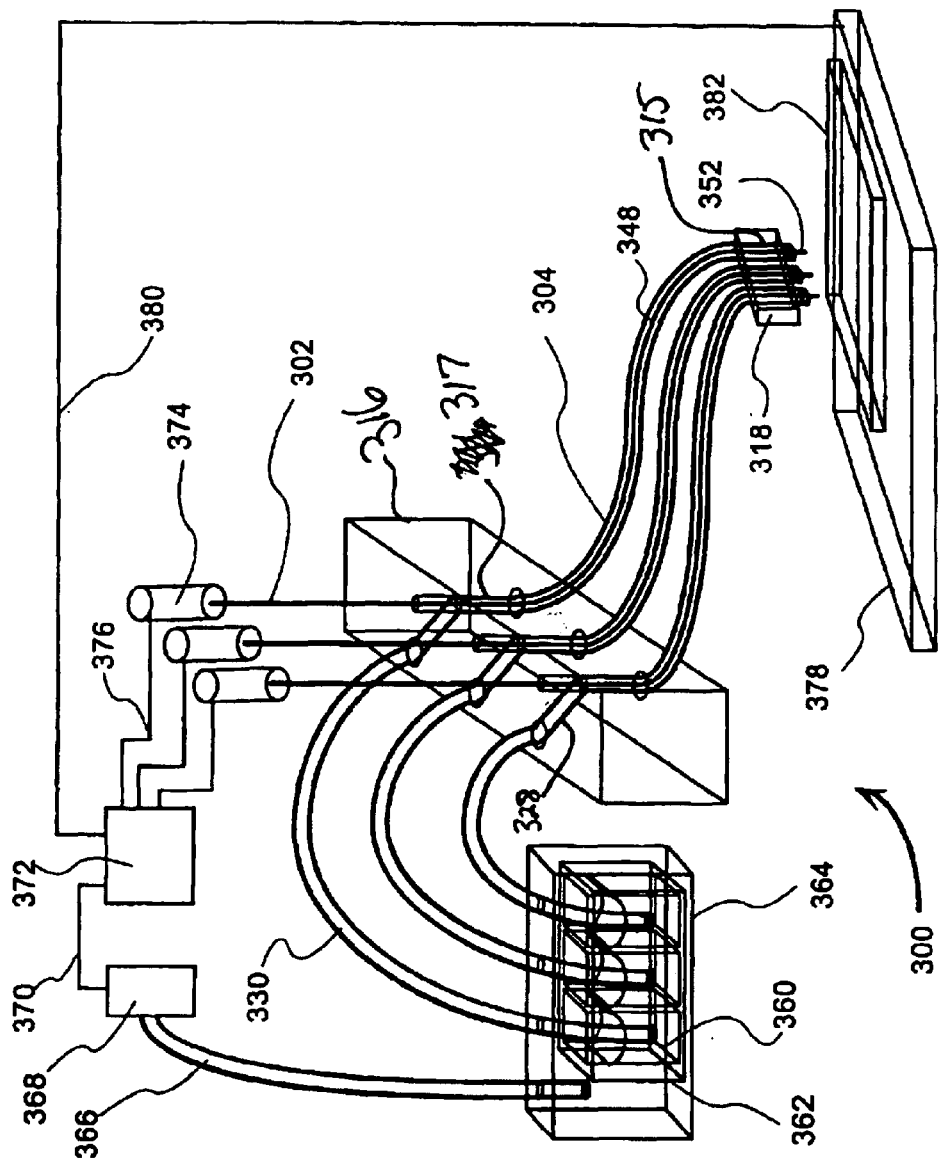
FIG. 3 shows how an apparatus according to the present invention may reformat the delivery of multiple fluids from an upstream structure to a downstream substrate.

Thus it can be appreciated that a multiple pin spotter apparatus can employ multi-well plates (such as microtiter plates, which typically have 96, 384, or 1536 wells) or other convenient storage vessels as reservoirs for the fluid, as shown in more detail in FIG. 3. FIG. 3 is a schematic wireframe view and illustrates a multiple pin-in-capillary spotting apparatus 300 having multiple pins 302, in this particular case three pins, slidably and extendibly maintained within multiple capillaries 304. In particular embodiments, the multiple pin-in-capillary spotting apparatus 300 has more than two pin-in-capillaries (302-in-304), up to about 8, 12, 96, 384, or 1536 pin-in-capillaries, or even more. Each capillary 304 defines a capillary lumen 348 in which a pin 302 is maintained and in which fluid is retained by capillary attraction forces. Each capillary has an upstream capillary end 317 and a downstream capillary end 315, and each pin 302 has a tip 352.

The capillaries 304, with the pins 302 slidably disposed within the capillary lumens 348, extend between a manifold body 316 and a downstream capillary holder 318 near the tips 352. The manifold body 316 retains the upstream capillary ends 317 and imposes a defined spatial format (an "upstream format") on the upstream capillary ends 317 for all of the capillaries 304 of the apparatus 300. In particular embodiments the upstream capillary ends 317 may be coupled the manifold body 316 via fittings that allow the upstream capillary ends 317 to be uncoupled and recoupled to the manifold body 316 in a different format, thus allowing the user to easily manipulate the spatial reformatting of the capillaries 304 between the manifold body 316 and the downstream capillary holder 318. The downstream capillary holder 318 retains the downstream capillary ends 315 and imposes a defined spatial format (a "downstream format") on the downstream capillary ends 315 (as well as the tips 352) for all of the capillaries 304 of the apparatus. In FIG. 3, the downstream capillary ends 315 are shown extending beyond the downstream surface of the downstream capillary holder 318, but in alternate embodiments the downstream capillary ends 315 terminate flush at the downstream surface of the downstream capillary holder 318 or even within the downstream capillary holder 318.

The manifold body 316 defines multiple off-axis channels 328, each off-axis channel 328 in fluid communication with at least one capillary lumen 348. Each off-axis channel 328 is also in fluid communication with one of multiple fluid reservoirs 360 via a source tube 330, similar to source tube 130 shown in FIG. 1. In particular embodiments the source tubes 330 may be coupled to the manifold body 316 via fittings that allow the source tubes 330 to be uncoupled and recoupled to the manifold body 316 in a different format, thus allowing the user to easily manipulate the spatial reformatting of the source tubes 330 between the manifold body 316 and the fluid reservoirs 360. In the embodiment shown in FIG. 3, the reservoirs 360 are wells in a multi-well plate 362. The skilled practitioner will readily appreciate that multi-reservoir formats such as microtiter plates (in 96, 384, or 1536 well format), as well as other readily available or custom formats, may be employed in embodiments having many more than three pin spotters. The multi-well plate 362 with fluid in one or more wells is fitted with a gas pressure manifold 364 that is connected to gas pressure line 366. The gas pressure line 366 is fed pressurized gas by gas source 368, which is controlled via a control path 370 by a controller 372. The controller 372 also controls multiple pin drivers 374 via control paths 376 and controls a movable stage 378 via control path 380. Each of control paths 370, 376, and 380 may be a two-way control path having feedback via feedback sensors, not shown, included in spotting apparatus 300. The pin drivers 374 are in operable relation to the pins 302. A substrate 382 such as a planar array substrate is located on the movable stage 378 near the tips 352. Glass slides are frequently used as a substrate when a transparent substrate is desired, although any suitable material may be used for the substrate, such as silica or plastic.

The controller 372 typically comprises a programmable computer system with appropriate interfaces to allow control of the gas pressure manifold 364, gas source 368, pin drivers 374, and movable stage 378. Movable stage 378 may permit controlled motion in three mutually perpendicular directional axes plus rotation in three mutually perpendicular rotational axes, or may permit controlled motion in a subset of three mutually perpendicular directional axes plus rotation in three mutually perpendicular rotational axes.

The pin drivers 374 may drive one or more of the pins 302 simultaneously, thus allowing selective deposition of multiple fluids on the receiving surface of the substrate 382.

In operation of spotting apparatus 300, the controller 372 signals the gas source 368 to provide a gas pressure which drives fluid to each of the capillary lumens 348. The controller 372 then directs the movement of movable stage 378 to orient and move the substrate 382 while selectively controlling the operation of pin drivers 374 according to user-defined criteria. The pin drivers 374 slide selected one or more of pins 302 within the capillaries 304, extending selected one or more of tips 352 from the downstream capillary ends 315 to deliver droplets of selected one or more fluids to substrate 382, and retracting the selected one or more of tips 352 after delivering the droplets to the substrate 382. Once the tips 352 are withdrawn into their corresponding capillary lumens 348, each tip 352 becomes re-wetted by the fluid held in the corresponding capillary lumen 348.

A format (a downstream format) is imposed by the downstream capillary holder 318 upon the downstream capillary ends 315. Advantageously, because the separate flexible capillaries 304 do not form a rigid matrix, the format (downstream format) of the downstream capillary ends 315 can be different than the format (a upstream format) at the upstream capillary ends 317, providing freedom in spatial reformatting between the fluid source (e.g. microtiter plates) and the resulting microarrays (drops of fluid deposited on the substrate). It will be apparent that source tubes 330 may analogously be spatially reformatted between the fluid reservoirs 360 and the off-axis channels 328 in the manifold body 316, providing additional freedom in spatial reformatting between the fluid source and the resulting microarrays. It can be seen in FIG. 3, for example, that the different fluids are close together in multi-well plate 362, farther apart in manifold body 316, and very close together in downstream capillary holder 318. It can also be seen in FIG. 3 that the same spatial ordering of the fluids is preserved as they transfer from multi-well plate 362 to manifold 316 to downstream capillary holder 318, but there is no reason why this preservation of spatial ordering must be present, since the routing and spatial ordering of the fluids can be varied by varying the routing of either capillaries 304, source tubes 330, or both.

Manifold body 316 as depicted in FIG. 3 provides for a linear arrangement of pin drivers 374 and a linear arrangement of the upstream ends of capillaries 304, but there is no reason why this should be the case other than convenience in fabrication and assembly, and various two-dimensional or three-dimensional arrangements of pin drivers and upstream capillary ends may be devised without departing from the spirit and scope of the invention.

Other reformatting arrangements are possible and are within the scope of the invention, e.g. an x-y grid of spots at the downstream capillary ends expanding to a single linear arrangement at the upstream capillary ends, or vice versa. In some embodiments the reformatting may be a scale change (compression of features to smaller size) that maintains the relative layout of the features, or the reformatting may be other than a simple change of scale. In some embodiments the spatial reformatting may result in scrambling of the format, for example a linear arrangement of capillaries numbered 1, 2, 3, 4, 5, 6, 7, and 8 may be reformatted to have a linear arrangement of capillaries 1, 4, 6, 2, 5, 8, 3, 7, or two linear banks of capillaries 1, 5, 8, 3 (first bank) and 2, 7, 4, 6 (second bank), or even a circular arrangement having the capillaries arranged 1, 6, 5, 3, 7, 8, 2, 4 around the circle. The formats may be dictated by structural or space limitations in the device or by functional considerations imposed by the format of the source fluid (like a multi-well plate), or by other considerations readily apparent to the skilled practitioner given this disclosure. In an exemplary embodiment, the substrate is planar, and the pins are arranged in complementary planar format. However, it is possible to adjust the structure of the apparatus (e.g. making the pins of varying length) to accommodate a non-planar substrate.

The fluid used in any pin spotter in accordance with the present invention may be any suitable fluid, including any fluids typically used in the manufacture of bioarrays; such fluids and processes for their use in manufacturing bioarrays are well known. The fluid may also be a slurry containing solid particles in a fluid suspension. The fluid is generally transferred in the form of a drop of fluid 108 clinging by surface tension to the tip 152 of the pin 102 as discussed above with reference to FIG. 1.

An alternative mechanism for fluid transfer is to propel a stream of fluid from the capillary lumen 150, 348 by mechanical displacement. In this embodiment, the pin 102, 302 is sized to occupy greater than about 90% of the cross-sectional area of the capillary 104, 304. The pin 102, 302 acts as a piston to force a quantity of fluid from the capillary 104, 304; the quantity of fluid delivered depends on the viscosity of the fluid, the distance the pin 102, 302 moves, and the speed of the pin 102, 302.

While the foregoing embodiments of the invention have been set forth in considerable detail for the purpose of making a complete disclosure of the invention, it will be apparent to those of skill in the art that numerous changes may be made in such details without departing from the spirit and the principles of the invention. Accordingly, the invention should be limited only by the following claims.

All patents, patent applications, and publications mentioned herein are hereby incorporated by reference in their entireties.

What is claimed is:

1. An apparatus for depositing a fluid from a fluid source onto a substrate, the apparatus comprising an off-axis channel adapted to being fluidically coupled to said fluid source, a flexible capillary in fluid communication with the off-axis channel, the capillary having a downstream capillary end adapted to receiving fluid from said fluid source, a flexible pin slidably disposed within the capillary, the pin having a downstream tip disposed adjacent the downstream capillary end, the tip being adapted to being wetted by said fluid in the capillary, and a pin driver operably coupled to the pin, wherein the pin driver is operable to move the tip toward the substrate to deposit said fluid onto said substrate.

2. An apparatus according to claim 1 having a plurality of flexible pins and flexible capillaries, each flexible pin slidably disposed within a flexible capillary.

3. The apparatus of claim 2 wherein a plurality of flexible pins are coupled to a common pin driver, the pin driver operable to extend the flexible pins as a group.

4. The apparatus of claim 2 having a plurality of pin drivers, wherein each flexible pin is coupled to a separate pin driver, each pin driver operable to extend the flexible pin coupled to that pin driver independently of every other flexible pin.

5. The apparatus of claim 2 having a plurality of pin drivers, each pin driver operably coupled to a plurality of flexible pins, each pin driver capable of extending said plurality of flexible pins coupled to said driver as a group.

6. The apparatus of claim 2 wherein each flexible capillary has a uniform cross-sectional area along its length.

7. The apparatus of claim 2, further comprising a downstream capillary holder retaining the flexible capillaries at or adjacent to the downstream capillary ends in a defined downstream format.

8. The apparatus of claim 7, wherein the upstream capillary ends are retained by a manifold body retaining the upstream ends of the flexible capillaries in a defined upstream format.

9. The apparatus of claim 8 wherein the defined downstream format is different from the defined upstream format.

10. The apparatus of claim 8 wherein the defined downstream format has the flexible capillaries relatively closer together than in the defined upstream format.

11. The apparatus of claim 8 wherein the defined downstream format is scrambled with respect to the defined upstream format.

12. The apparatus of claim 1, wherein the flexible capillary has an upstream capillary end opposite the downstream capillary end, wherein the capillary defines a capillary lumen, and wherein the flexible pin runs from the tip through the capillary lumen to the pin driver.

13. The apparatus of claim 12 further comprising a flex region operably associated with the flexible pin.

14. The apparatus of claim 13 wherein the flex region is incorporated into the structure of the flexible pin.

15. The apparatus of claim 12 wherein the flexible pin has a flex region between the upstream capillary end and the pin driver.

16. The apparatus of claim 1 wherein the flexible capillary defines a capillary lumen and the capillary lumen may be supplied with fluid without removing the flexible pin from the flexible capillary.

17. The apparatus of claim 1, further comprising at least 12 apparatuses according to claim 1 held in a fixed arrangement with respect to each other.

18. The apparatus of claim 1, further comprising at least 96 apparatuses according to claim 1 held in a fixed arrangement with respect to each other.

19. The apparatus of claim 1, further comprising at least 384 apparatuses according to claim 1 held in a fixed arrangement with respect to each other.

20. The apparatus of claim 1, further comprising at least 1536 apparatuses according to claim 1 held in a fixed arrangement with respect to each other.

* * * * *